Patented Dec. 28, 1937

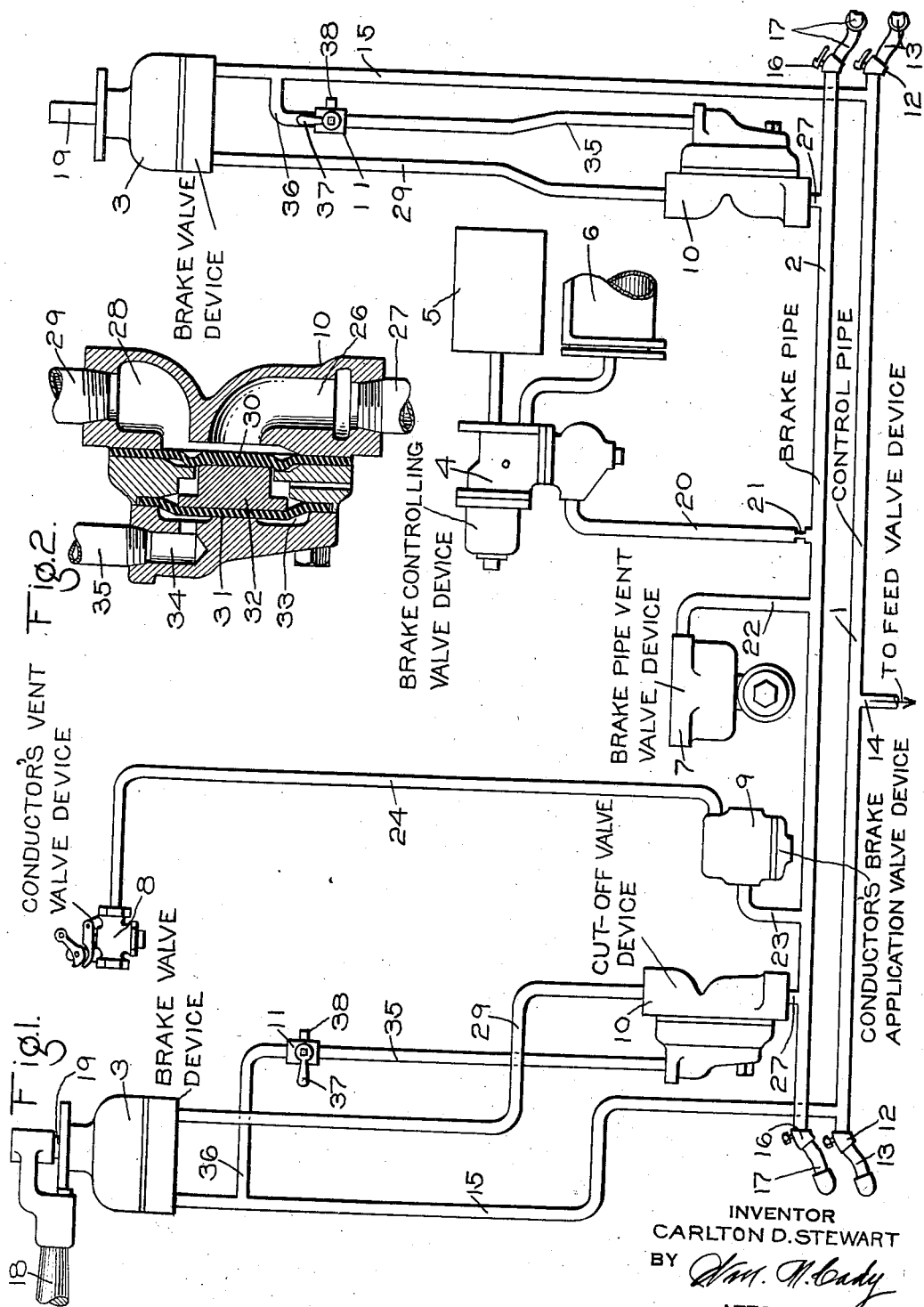

2,103,343

UNITED STATES PATENT OFFICE 2,103,343

FLUID PRESSURE BRAKE

Carlton D. Stewart, Swissvale, Pa., assignor to The Westinghouse Air Brake Company, Wilmerding, Pa., a corporation of Pennsylvania Application September 16, 1936, Serial No. 100,997

9 Claims. (Cl. 303—14)

This invention relates to fluid pressure brake equipment and more particularly to that type in which there is employed a brake pipe and valve means responsive to a reduction in brake pipe pressure to effect an application of the brakes and which is responsive to a subsequent increase in brake pipe pressure to effect the release of the brakes.

When a number of such equipments are operatively connected together, as in a train, it is very desirable that a reduction in brake pipe pressure, especially in effecting an emergency application of the brakes, be transmitted or propagated as rapidly as possible from one end of the train to the other so as to apply the brakes at the rear end of the train more nearly in synchronism with those at the front end of the train and thereby bring the train to a prompt stop without harsh run in or closing of the slack in the train.

In some classes of passenger train service, one or more electrically controlled traction cars are coupled together to form a train. The brake equipment for each of these cars may include a brake valve device at each end of each car. When the cars are coupled together as just noted, the brakes are normally controlled by the operator through the medium of the brake valve device located at the front end of the head car of the train, the brake valve device on the rear end of the head car and the brake valve devices on each of the other cars being in the usual handle-off position in which they are rendered inoperative to control the brakes. In this type of car the brake valve devices are arranged a sufficient distance above the car floor to be convenient for manipulation by an operator. Due to this the branch pipe which connects each brake valve device with the brake pipe must necessarily be of considerable length. The brake equipment for this type of car usually includes a brake controlling valve device, such as a triple valve device, which is adapted to operate according to variations in brake pipe pressure for effecting either an application or the release of the brakes and may also include a brake pipe vent valve device and a conductor's brake application valve device, the brake pipe vent valve device being adapted to respond to a reduction in brake pipe pressure initiated through the medium of the brake valve device to vent fluid under pressure from the brake pipe and the conductor's brake application valve device being responsive to the operation of the usual conductor's valve to effect the reduction in brake pipe pressure and thereby an application of the brakes. This latter valve is operated by the conductor only when a dangerous situation arises of which the operator is not aware and is intended to cause an emergency application of the brakes to be effected.

It has been found that in a train, such as just described, the branch pipes which are in open communication with the brake pipe and lead therefrom to the brake valve devices, brake controlling valve devices, brake pipe vent valve devices, and conductor's application valve devices as well as the piston chamber of the brake controlling valve devices adds so greatly to the volume of the brake pipe that the desired rapid propagation of a brake pipe reduction in effecting an emergency application of the brakes could not be obtained due to the back-flow of fluid from this added volume to the brake pipe. In fact, on a train of ten traction cars the amount of fluid which flows back into the brake pipe from the numerous branch passages and triple valve piston chambers may be great enough to prevent an emergency reduction in brake pipe pressure from being transmitted to the rear cars of the train, with the result that the slack in the train is caused to run in or close harshly and the train is not brought to a stop within a distance commensurate with the safe operation of the train.

The principal object of the present invention is to provide an improved fluid pressure brake equipment of the above type which will be free of the above mentioned objectionable features.

This object is obtained by reducing to a minimum the length and thereby the volume of all branch pipes which are in open communication with the brake pipe and which might have a detrimental influence on the flow of fluid through the brake pipe and by providing means adapted to restrict the flow of fluid between relatively large chambers and the brake pipe. In brake equipment where, in train service, certain connections, such as the connections between the brake pipe and the inoperative brake valve devices of the brake equipment hereinbefore mentioned, are not needed, and in such equipment the object of the invention is attained by cutting off communication between the brake pipe and such connections in addition to maintaining all branch connections communicating with the brake pipe as short as possible and by choking those connections which are in communication with relatively large chambers.

Another object of the invention is to provide, in a fluid pressure brake equipment of the type having a brake pipe and one or more fluid conducting pipes or passages which must necessarily be open to the brake pipe in one class of service and which need not be opened in another class of service, means located adjacent the brake pipe and adapted to be controlled from a point remote from the brake pipe for cutting off communication between the brake pipe and said pipes or passages when the equipment is employed in said other class of service.

In the type of brake equipment employed on traction cars, this object is attained through the medium of a cut-off valve device which is located adjacent the brake pipe and is interposed in the usual branch pipe leading from the brake pipe to a brake valve device and which is preferably operative by fluid under pressure controlled by a valve located in the operator's cab and preferably close to the brake valve device.

Other objects and advantages will appear in the following more detailed description of the invention.

In the accompanying drawing Fig. 1 is a diagrammatic view of a fluid pressure brake equipment embodying the invention and Fig. 2 is an enlarged detailed sectional view of the cut-off valve device of the equipment.

As shown in Fig. 1 of the drawing the equipment may comprise a control pipe 1, a brake pipe 2, brake valve devices 3 arranged one at each end of the equipment, a brake controlling valve device 4, an auxiliary reservoir 5, a brake cylinder 6, a brake pipe vent valve device 7, a conductor's vent valve device 8, a conductor's brake application valve device 9, two cut-off valve devices 10 arranged one at each end of the equipment and two control cocks 11 arranged one at each end of the equipment.

The control pipe 1 is adapted to extend from end to end of a car and at each end is provided with an angle cock 12 to which is secured a flexible conduit 13 for attachment in the usual manner with a like conduit of an adjacent car when two or more cars are coupled together. This pipe is connected through a branch pipe 14 with a fluid pressure supply source, such, for instance, as the usual feed valve device, not shown, and is also connected by way of pipes 15 to the brake valve devices 3.

The brake pipe 2 also extends from end to end of the car and at each end is provided with an angle cock 16 to which is secured a flexible conduit 17 for attachment in the usual manner with a like conduit of an adjacent car when two or more cars are coupled together.

It will here be understood that when one car is to be operated as a unit, all of the angle cocks 12 and 16 will be closed and that when a plurality of cars are coupled together to form a train only the angle cocks at the front end of the head car of the train and those at the rear end of the last car of the train are closed, so that the control pipe and brake pipe will be continuous from end to end of the train.

The brake valve devices 3 may each be of the usual construction and may comprise a casing containing a rotary valve, not shown, which is adapted to be moved to its several brake controlling positions by means of the usual handle 18 which is removably applied to the rotatable stem 19 of the valve. It will here be understood that when the car is to be operated as a unit, the brake valve device at the rear end of the car will be in handle off position and the handle removed, and that when a plurality of cars are coupled together to form a train all of the brake valve devices, with the exception of the one at the front end of the head car of the train, will be in handle off position and the handles removed.

The brake controlling valve device 4 shown in the present embodiment of the invention, is in the form of the usual triple valve device and is operative upon a reduction in brake pipe pressure to supply fluid under pressure from the auxiliary reservoir 5 to the brake cylinder 6 to effect an application of the brakes and upon a subsequent increase in brake pipe pressure to release fluid under pressure from the brake cylinder to effect the release of the brakes. This device is placed as close to the brake pipe as the construction of the car body will permit and is connected through a branch pipe 19 to the brake pipe, the flow area of the pipe 19 being restricted at a point very close to the brake pipe as indicated in Fig. 1 by the reference character 21. The brake pipe vent valve device 7 and conductor's brake application valve device 9 are each of the usual and well known construction and are connected to the brake pipe by way of pipes 21 and 22, respectively, the devices being placed as close to the brake pipe as possible so that the pipes 21 and 22 will be of the shortest possible length.

The conductor's valve device 8 is of the usual construction and is connected to the brake application valve device through the usual control pipe 23.

Each cut-off valve device 10 is placed very close to the brake pipe and comprises a casing having a passage 26 which is connected through a very short piece of pipe 27 to the brake pipe and also having a passage 28 which is connected through a pipe 29 to the brake valve device at one end of the car. Communication between these passages 26 and 28 is adapted to be controlled by a flexible diaphragm valve 30 which is mounted in the casing. The operation of this diaphragm valve is adapted to be controlled by a flexible diaphragm 31 mounted in the casing, which diaphragm acts on the valve through the medium of a follower 32 interposed between and operatively engaging the diaphragm valve 30 and diaphragm 32.

At one side of the flexible diaphragm 32 there is a chamber 33 which is adapted to be connected to the branch pipe 15 by way of a passage 34, a pipe 35, the control valve device 11 and a pipe 36 which is in constant open communication with the branch pipe 15.

In the present embodiment of the invention each of the valve devices 11 is located in the operator's cab, preferably close to the brake valve device and is adapted to be operated either to the position in which it is shown at the right hand end of Fig. 1 or to the position in which it is shown at the left hand end of this figure, the valve in the first mentioned position establishing communication between the pipes 35 and 36 and consequently between the control pipe and the diaphragm chamber 32 of the cut-off valve device 10, and in its other position establishing communication from the pipe 35 and thereby the chamber 33 with the atmosphere by way of an exhaust port 38. When a plurality of cars are coupled together in a train the valve device 11 at the front end of the head car of the train will be in the position in which it is shown at the left hand end of Fig. 1 and all other such valves will be in the position in which they are shown at the right hand end of this figure.

In operation, in initially charging the equipment fluid under pressure supplied by the feed valve device flows through pipe 14 to the control pipe 1 and from thence flows through pipe 15 at each end of the car to the brake valve devices 3. With the brake valve device 3 at the front end of the head car of the train in release position as shown in Fig. 1, the rotary valve of the brake valve device is adapted to establish communication between the pipe 15 and the pipe 29 so that fluid under pressure being supplied through pipe 15 flows through pipe 29, passage 28 of the cut-off valve device 10, past the unseated diaphragm valve 30 and through passage 26 and short pipe 27 to the brake pipe 2. It will here be noted that since the control valve device 11 at the front end of the car is in position connecting the diaphragm chamber 33 of the cut-off valve device to the atmosphere the diaphragm valve 30 will be maintained unseated by fluid under pressure in chambers 28 and 26. At the rear end of the car the control valve device 11 establishes communication between the pipes 35 and 36 so that fluid under pressure supplied to the pipe 15 at the rear end of the car flows to the diaphragm chamber 33 of the associated cut-off valve device 10, and causes the diaphragm to flex and seat the diaphragm valve 30, so as to cut off communication between the passages 28 and 26 and consequently between the pipe 29 and the brake pipe 2. Since the valve devices 11 on the other cars of the train are in the same position as the valve at the rear end of the first car of the train, all of the branch pipes 29 will be isolated from the brake pipe 2. Fluid under pressure continues to flow through the cut-off valve device 10 at the front end of the car and pipe 27 until the brake pipe and associated chambers are fully charged to the desired pressure.

When it is desired to effect an emergency application of the brakes, the brake valve device 3 at the front end of the head car of the train is moved, through the medium of the handle 18, to emergency position in which fluid under pressure is vented from the brake pipe at an emergency rate for the purpose of causing the triple valve devices on each car to move to emergency application position. The brake pipe vent valve device 7 on each car responds to this reduction to effect a local reduction in brake pipe pressure so as to propagate the reduction in brake pipe pressure rapidly throughout the length of the train. It will here be noted that since all but one of the long pipes 29 are isolated from the brake pipe and the branch pipes 20, 22 and 23 are very short and since, in addition, the passage 20 is restricted at a point close to the brake pipe, the back-flow of fluid from said passages to the brake pipe will be so minimized that it will have no material retarding effect upon the transmission of the emergency rate of reduction in brake pipe pressure.

In practice it has been found on a train embodying the invention, that the emergency action is propagated throughout the entire length of the train and that the propagation rate of such action is much more rapid than has heretofore been possible.

It will be apparent from the foregoing description that invention not only serves to increase the rate of transmission and the effectiveness of an emergency reduction in brake pipe pressure but also serves to increase the rate of transmission and effectiveness of a service reduction in brake pipe pressure, and obviously further provides for a more rapid charging of the equipment.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, in combination, a brake pipe, a reduction in the pressure of which brake pipe is adapted to cause the equipment to operate to effect an application of the brakes a plurality of brake controlling valve devices for controlling an application of the brakes, connections from said brake pipe to said devices, some of said connections being of minimum length, others, which lead from relatively large volumes, being of minimum length and being restricted at a point close to the brake pipe and others of greater length and unnecessary in certain braking operations being adapted to be cut off from the brake pipe, all of which combined minimizes the amount and rate of back-flow of fluid from said devices to the brake pipe upon a reduction in brake pipe pressure and thereby minimizes the detrimental effect back-flow of fluid may have on the transmission of the reduction in brake pipe pressure throughout a plurality of operatively connected brake equipments.

2. In a fluid pressure brake equipment, in combination, a brake pipe, a reduction in the pressure of which brake pipe is adapted to cause the equipment to operate to effect an application of the brakes, a plurality of brake controlling valve devices for controlling an application of the brakes connections from said brake pipe to said devices, some of said connections being of minimum length, others, which lead from a relatively large volume, being of minimum length and being restricted at a point close to the brake pipe and others of greater length and unnecessary when a plurality of the equipments are operatively connected together, as in a train, being cut off from the brake pipe, all of which combined minimizes the amount and rate of back-flow of fluid from said devices to the brake pipe upon a reduction in brake pipe pressure and thereby minimizes the detrimental effect back-flow of fluid may have on the transmission of the reduction in brake pipe pressure throughout a plurality of operatively connected brake equipments.

3. In a fluid pressure brake equipment, in combination, a brake pipe, a reduction in the pressure of which brake pipe is adapted to cause the equipment to operate to effect an application of the brakes, a plurality of brake controlling valve devices for controlling an application of the brakes, connections from said brake pipe to said devices, some of said connections being of minimum length, others, which lead from a relatively large volume, being of minimum length and being restricted at a point close to the brake pipe and others of greater length and unnecessary when a plurality of the equipments are operatively connected together, as in a train, being adapted to be cut off from the brake pipe, all of which combined minimizes the amount and rate of back-flow of fluid from said devices to the brake pipe upon a reduction in brake pipe pressure and thereby minimizes the detrimental effect back-flow of fluid may have on the transmission of the reduction in brake pipe pressure throughout a plurality of operatively connected brake equipments, valve devices arranged close to the brake pipe and operative to cut off the last mentioned connections from the brake pipe, and means remotely positioned with relation to said valve devices and operative to effect the operation of the devices.

4. In a fluid pressure brake equipment for cars of a train and comprising a brake pipe adapted to be connected to the brake pipe of an adjacent vehicle of the train, a reduction in the pressure of fluid in the brake pipe being adapted to cause an application of the brakes to be effected, said equipment having at least one fluid conducting communication connected to the brake pipe which is unnecessary in train service, and means included in the equipment operable to cut off said communication at a point close to the brake pipe.

5. In a fluid pressure brake equipment for cars of a train and comprising brake pipe adapted to be connected to the brake pipe of an adjacent vehicle of the train, a reduction in the pressure of fluid in the brake pipe being adapted to cause an application of the brakes to be effected, said equipment having at least one fluid conducting communication connected to the brake pipe which is unnecessary in train service, and means included in the equipment operable to cut off said communication at a point close to the brake pipe, and valve means located remotely with relation to the means and operable to control the operation of said means.

6. In a fluid pressure brake equipment for cars of a train and comprising a brake pipe adapted to be connected to the brake pipe of an adjacent vehicle of the train, a reduction in the pressure of which continuous brake pipe causes an application of the brakes to be effected, said equipment having at least one fluid conducting communication connected to the brake pipe which is necessary in single car operation and unnecessary in train operation, fluid pressure controlled means included in the equipment operable to cut off said communication close to the brake pipe, and valve means located remotely with relation to the valve means operable to control the operation of said valve means.

7. In a fluid pressure brake equipment for a vehicle, in combination, a brake pipe extending from end to end of the vehicle, a reduction in the pressure of which brake pipe is adapted to cause an application of the brakes to be effected, a brake valve device, a fluid conducting pipe through which said brake valve device is adapted to supply fluid under pressure to and release fluid under pressure from the brake pipe, a controlling valve device disposed closely adjacent the brake pipe for controlling communication through said fluid conducting pipe, and means disposed for convenience of operation by the operator for controlling the operation of said controlling valve device.

8. In a fluid pressure brake equipment for a vehicle, in combination, a brake pipe extending from end to end of the vehicle, a reduction in the pressure of which brake pipe is adapted to cause an application of the brakes to be effected, a brake valve device, a fluid conducting pipe through which said brake valve device is adapted to supply fluid under pressure to and release fluid under pressure from the brake pipe, a controlling valve device disposed closely adjacent the brake pipe and operative by fluid under pressure for closing communication through said fluid conducting pipe, and manually operable valve means disposed for convenience of operation by an operator for varying the fluid pressure on said controlling valve device.

9. In a fluid pressure brake equipment, in combination, a brake pipe, a brake valve device operative to vary the fluid pressure in said pipe, a controlling valve device disposed closely adjacent to said pipe for controlling communication through which said brake valve device supplies fluid to the brake pipe, manually operable means disposed adjacent to the brake valve device for controlling the operation of said controlling valve device, a brake controlling valve device operative upon a reduction in brake pipe pressure for effecting an application of the brakes, communication through which brake pipe pressure on said brake controlling valve device is varied being restricted closely adjacent to the brake pipe, a valve device disposed closely adjacent to the brake pipe and operated by a variation in fluid pressure for venting fluid from the brake pipe, a conductor's valve device for varying the fluid pressure on said last named valve device, and a brake pipe vent valve device disposed closely adjacent to said brake pipe and substantially midway of the brake pipe on the vehicle and operative upon a sudden reduction in brake pipe pressure for locally venting the brake pipe.

CARLTON D. STEWART.